J. F. MIDDELSTADT.
WATER TRAP FOR LIGHTING SYSTEMS.
APPLICATION FILED JULY 14, 1916.
1,271,195.  Patented July 2, 1918.
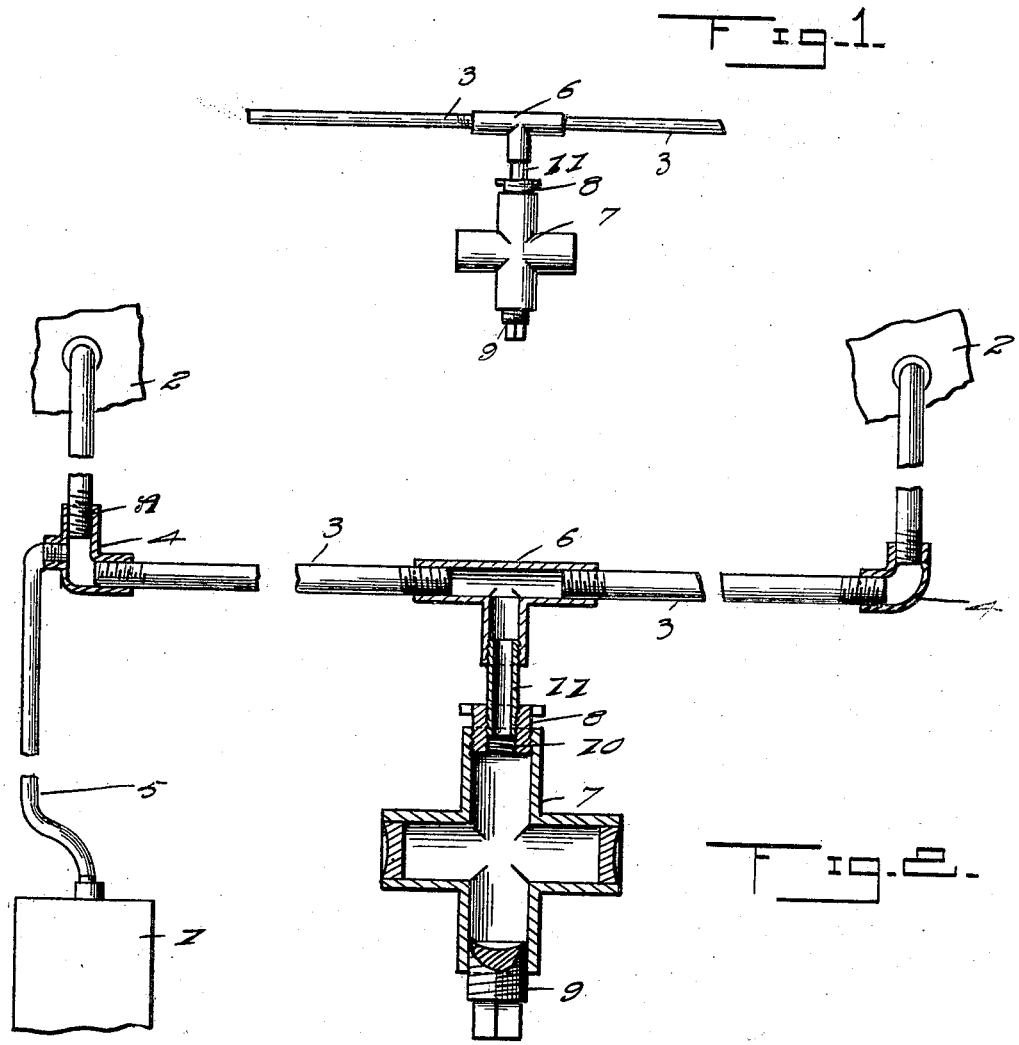

UNITED STATES PATENT OFFICE.

JOHN F. MIDDELSTADT, OF CRABTREE, OREGON.

WATER-TRAP FOR LIGHTING SYSTEMS.

1,271,195.

Specification of Letters Patent.   Patented July 2, 1918.

Application filed July 14, 1916.   Serial No. 109,307.

*To all whom it may concern:*

Be it known that I, JOHN F. MIDDELSTADT, a citizen of the United States, residing at Crabtree, in the county of Linn and State of Oregon, have invented certain new and useful Improvements in Water-Traps for Lighting Systems; and I do hereby declare the following to be a full, clear, and exact description of the invention, such as will enable others skilled in the art to which it appertains to make and use the same.

The object of this invention is to install at an advantageous point in a carbid light system for automobiles, a novel, simple and effective trap or collector for collecting water that accompanies the gas to the distributing pipe, of the system, so as to prevent water from entering the lamps.

Other objects will appear and be better understood from that embodiment of my invention of which the following is a specification, reference being had to the accompanying drawing forming a part thereof in which:

Figure 1 is a vertical elevation of the trap showing the same in operative position.

Fig. 2 is a view of the lighting system and showing the trap or collector in section.

Referring to the drawing in detail, the letter A designates the lighting system, as an entirety, and which includes the gas generator 1, lamps 2, distributing pipe 3 which is connected up with the pipes leading to the lamp by means of elbows 4, the generator in turn being communicated with the pipe 3 by means of a connecting pipe 5 which has one end extending through the side of one of the elbows, as shown in Fig. 2. The distributing pipe 3 is formed of sections, which are connected by means of the head of a T-joint 6.

Located below the distributing pipe 3, and at a point directly below the T-joint 6 is a trap or collector 7. This collector is of cross shape, having the outer ends of the upper and lower branches closed by removable plugs designated, respectively, 8 and 9. The upper plug 8 is provided with a passage 10, the walls of which are threaded, and which passage receives the lower end of a nipple 11, the upper end of the nipple being received by the stem of the T-shaped joint 7 as shown in the drawing.

In use, when gas is introduced through the pipe 5, it will, by the time it reaches the adjacent elbow become cooled, resulting in moisture accompanying the same being condensed upon the entrance of the gas into the pipe 3. The water of condensation will then pass through the pipe 3 into the T-joint 6, and then drop into the collector 7. When it is desired to drain water from the collector, the plug 9 is removed so as to admit of the collected water being discharged through the lower branch of the collector. The horizontal arms of the collector 7 form handles whereby the collector can be readily grasped, so that the same can be turned when it is desired to apply or remove the collector from the lighting system.

It is evident, that various changes might be made in the construction, form and arrangement of the several parts without departing from the spirit and scope of the invention.

Having thus described my invention, what I claim as new is:

In a carbid light system the combination with a distributing pipe formed of sections, of a T-joint connecting the sections to each other, a nipple removably connected to the T-joint, a collector disposed below the T-joint and including a cross shaped body, a hollow nut removably connecting the upper end of the vertical member of the body to the lower end of the nipple, a plug removably mounted in the lower end of said vertical member, and plugs secured in the ends of the horizontal member of the body.

In testimony whereof I affix my signature in presence of two witnesses.

JOHN F. MIDDELSTADT.

Witnesses:
SAML. M. GARLAND,
G. M. POWER.

Copies of this patent may be obtained for five cents each, by addressing the "Commissioner of Patents, Washington, D. C."